US011872836B2

(12) United States Patent
Cummings

(10) Patent No.: US 11,872,836 B2
(45) Date of Patent: Jan. 16, 2024

(54) CRAYON HOLDER

(71) Applicant: Violet Grace Cummings, Torrance, CA (US)

(72) Inventor: Violet Grace Cummings, Torrance, CA (US)

( * ) Notice: Subject to any disclaimer, the term of this patent is extended or adjusted under 35 U.S.C. 154(b) by 0 days.

(21) Appl. No.: 17/877,658

(22) Filed: Jul. 29, 2022

(65) Prior Publication Data

US 2023/0398809 A1 Dec. 14, 2023

Related U.S. Application Data

(60) Provisional application No. 63/351,538, filed on Jun. 13, 2022.

(51) Int. Cl.
*B43K 23/016* (2006.01)

(52) U.S. Cl.
CPC .................................. *B43K 23/016* (2013.01)

(58) Field of Classification Search
CPC .............................. B43K 21/04; B43K 23/016
USPC ............................................... 401/50, 88, 92
See application file for complete search history.

(56) References Cited

U.S. PATENT DOCUMENTS

| | | | | |
|---|---|---|---|---|
| 937,815 A * | 10/1909 | Knapp | B43K 21/22 24/11 CT |
| 1,931,138 A * | 10/1933 | Staff | B43K 23/00 401/106 |
| 5,551,787 A * | 9/1996 | Rosenthal | B43K 21/06 401/75 |
| D402,691 S * | 12/1998 | Zbras, Jr. | D19/204 |
| 6,149,332 A * | 11/2000 | Huang | B43K 23/016 401/88 |
| 6,276,854 B1 * | 8/2001 | Mullins | B43K 23/016 D19/204 |
| 6,402,407 B1 * | 6/2002 | Goldstein | B43K 23/016 401/6 |
| 2012/0285029 A1 * | 11/2012 | Jung | B43K 19/14 33/483 |
| 2018/0339542 A1 * | 11/2018 | Orem | B43K 27/00 |

* cited by examiner

*Primary Examiner* — David P Angwin
*Assistant Examiner* — Bradley S Oliver
(74) *Attorney, Agent, or Firm* — Donald R. Boys; Central Coast Patent Agency LLC

(57) ABSTRACT

A crayon holder has a cylindrical body having a length, an outside diameter and an inside diameter, the inside diameter providing a slip fit for a crayon, and a mechanism adapted to hold a crayon, once inserted into the cylindrical body at a first end, in place in the cylindrical body while the crayon holder is manipulated in use.

3 Claims, 5 Drawing Sheets

CRAYON HOLDER

CROSS-REFERENCE TO RELATED DOCUMENTS

The present application claims priority to provisional application 63/351,538, filed Jun. 13, 2022. All disclosure of the parent applications is incorporated herein at least by reference.

BACKGROUND OF THE INVENTION

1. Field of the Invention

The present invention is in the technical field of art supplies and pertains more particularly to a device to hold wax crayons and stubs of crayons while drawing with the crayons.

2. Description of Related Art

Crayons are very well known in the art. Nearly every child is familiar with coloring books and has access to a box of crayons to color between the lines. The inventor and others are aware of problems when drawing with crayons. Crayons are made of waxes such as paraffin, beeswax, and carnauba wax with dry colors added. In some cases, synthetic waxlike materials are also used in modern crayons. The waxes are melted, and the dry color added with continuous mixing until thoroughly dispersed.

One problem is that the crayons, being made of various sorts of wax, are not strong and durable. It is necessary that the wax be relatively soft so colored wax may adhere to a paper upon which a user is making a crayon drawing. So it is common for crayons to break while being used, and the user has to be careful as to the amount of pressure applied. Broken crayons may still be used as stubs but may be more difficult to hold than an unbroken crayon, and the stubs may break again.

What is clearly needed is a holder device into which crayons and crayon stubs may be inserted and held while being used for drawing.

BRIEF SUMMARY OF THE INVENTION

In one embodiment of the invention a crayon holder is provided, comprising a cylindrical body having a length, an outside diameter and an inside diameter, the inside diameter providing a slip fit for a crayon, and a mechanism adapted to hold a crayon, once inserted into the cylindrical body at a first end, in place in the cylindrical body while the crayon holder is manipulated in use. In one embodiment the cylindrical body has a cross slot proximate the first end exposing a portion of a crayon in the cylindrical body, and the mechanism adapted to hold the crayon in place is a portion of a spring-loaded clothespin, including the spring of the clothespin. Also, in one embodiment the portion of the spring-loaded clothespin lies parallel to the cylindrical body, the spring contacts both the portion of the clothespin and the cylindrical body, asserting pressure urging the portion of the clothespin against the exposed portion of the crayon, holding the crayon in place in the cylindrical body. In one embodiment the crayon holder further comprises a zip tie adapted to hold the portion of the spring-loaded clothespin securely to the cylindrical body. And in one embodiment the crayon holder further comprises a crayon sharpening apparatus affixed at a second end of the cylindrical body.

In an alternative embodiment of the invention a crayon holder is provided comprising a cylindrical body having a length, an outside diameter and an inside diameter, the inside diameter providing a slip fit for a crayon, a plunger with a maximum outside diameter providing a slip fit to the inside diameter of the cylindrical body, the plunger having a series of smoothed circular grooves over a portion of the length of the plunger, a crayon retainer affixed to a first end of the cylindrical body, the crayon retainer comprising a flexible, circular donut of an inside diameter less than the outside diameter of the crayon, and a plunger retainer affixed to a second end of the cylindrical body, the plunger retainer comprising a plurality of solid holder elements urged inward, impinging on one groove in the series of smoothed circular grooves of the plunger, wherein a crayon inserted in the first end of the cylindrical body is prevented from falling out by the crayon retainer, and the plunger inserted into the second end of the cylindrical body to an extent to contact the crayon holds the crayon in place as pressure is exerted in drawing with the crayon.

In one embodiment the flexible, circular donut is a circular piece of plastic film having a central hole of a diameter smaller than the outside diameter of the crayon. Also, in one embodiment the plunger retainer comprises a circular piece of foam rubber-like material having a center hole of a diameter greater than the maximum outside diameter of the plunger and the solid holder elements are plastic balls embedded on the inside of the center hole in the circular piece of foam rubber-like material. In one embodiment the crayon holder further comprises a crayon sharpener affixed to one end of the plunger. And in one embodiment the cylindrical body is a length of metal tubing.

DETAILED DESCRIPTION OF THE INVENTION

Figure 1:
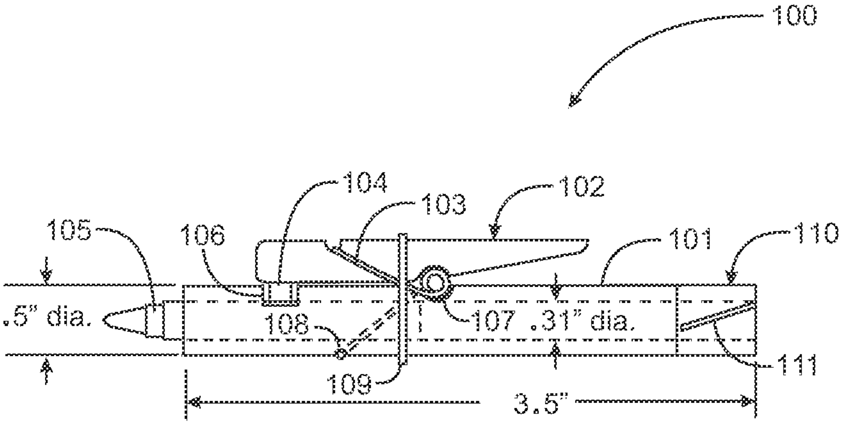
FIG. 1 is a side elevation view of a crayon holder, holding a crayon, in an embodiment of the present invention.

FIG. 1 is an assembly view of a crayon holder 100 holding a crayon 105 in an embodiment of the present invention. In this embodiment the crayon holder has a cylindrical body 101 with a longitudinal axis, the cylindrical body fashioned from a wooden dowel and having an outside diameter of 0.5 inches, a length of 3.5 inches and a central bore with an inside diameter of 0.31 inches. The inside diameter of 0.31 inches is to accommodate by slip fit a standard crayon which is nominally 0.30 inches diameter and 3 inches in length.

In the example of FIG. 1 the outside diameter and the inside diameter of cylindrical body 101 might vary somewhat, as well as the length. In this embodiment a rectangularly shaped cross slot 106 is cut in the cylindrical body orthogonal to the longitudinal axis, to accommodate an extension element 104 glued or otherwise joined to a portion 102 of a spring-loaded clothespin. A semicircular cross slot 107 also orthogonal to the longitudinal axis is cut in the cylindrical body to provide an anchor point for the body of spring 103 of the clothespin portion, and another, smaller semicircular cross slot 108 is cut across the cylindrical body to provide an anchor point for the lower arm of spring 103. Finally, a zip tie 109 is added around both the clothespin portion and cylindrical body 101 to secure the clothespin elements to cylindrical body 101.

In practice a user may press down on the narrow end of the clothespin portion 102 while holding cylindrical body 101 to raise extension element 104 and insert a crayon or a piece of a broken crayon 105 into the central bore of the dowel, and then release the narrow end of the portion 102, causing element 104 to contact and hold the crayon or crayon piece in place in cylindrical body 101 of the crayon holder. The user may than grasp the crayon holder and manipulate the crayon to draw. The user may release and remove one crayon or broken crayon and insert another at will. The position of cross slot 106 relative to the end of cylindrical body 101 determines how short of a broken piece of crayon may be used. Ideally the position should be close to the end.

In one embodiment of the invention a crayon sharpener 110 is implemented on a backend of cylindrical body 101, enabling a user to sharpen a crayon or a crayon stub prior to inserting same in the front end of the crayon holder. The sharpener is much the same as a pencil sharpener, having a blade on an angle and an opening 111 for shavings to exit.

Figure 2:
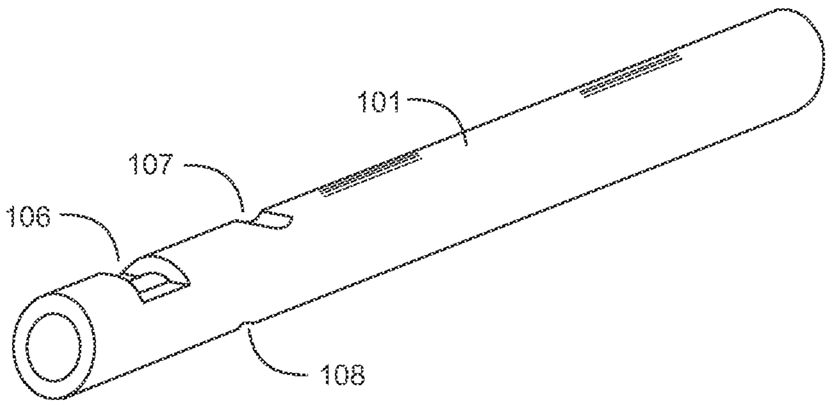
FIG. 2 is a perspective view of a tubular body of the crayon holder of FIG. 1 in an embodiment of the invention.

FIG. 2 is a perspective view of cylindrical body 101 better illustrating machining to be performed to accommodate the elements of a clothespin to make a crayon holder according to an embodiment of the present invention. Cross slots 106, 107 and 108 are clearly shown in relative positions. The dimensions for location of the slots may be determined by measuring elements of a clothespin to be used with cylindrical body 101 to make a crayon holder.

Figure 3A:
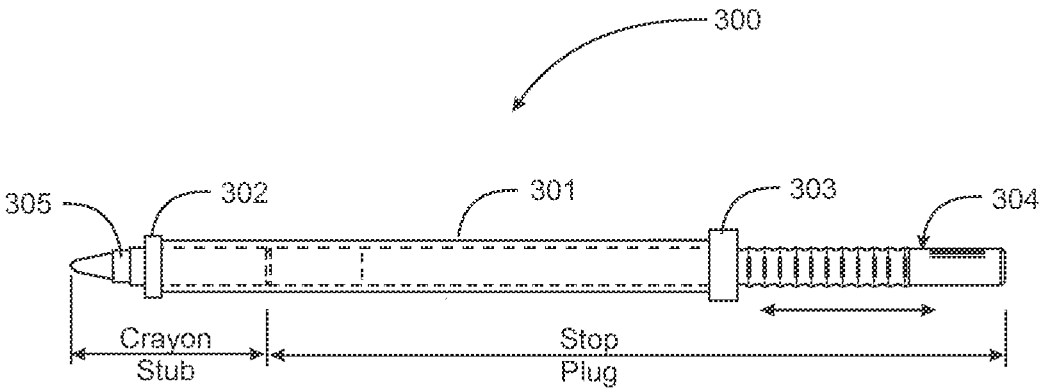
FIG. 3A is a side elevation view of a crayon holder in an alternative embodiment of the invention.

The crayon holder of FIG. 1 is a useful device, however the inventor has implemented improvements. FIG. 3A is an elevation view of a crayon holder according to an embodiment of the invention that the inventor believes may be easier to use and may be more appropriate for a manufacturer of crayons to package with crayons.

Crayon holder 300 in FIG. 3A has a tubular body 301 that may be in different embodiments metal, such as stainless steel or aluminum, or may be plastic in some embodiments. In one embodiment tubular body 301 may be transparent. A crayon retainer 302, described in enabling detail below, fits to one end of tubular body 301, and serves to keep a crayon or crayon stub in the holder once placed in the holder. A plunger retainer 303, also described in enabling detail below, fits to the opposite end of the tubular body and serves to position and retain a plunger 304 that may be positioned in the tubular body to back up a crayon or crayon stub.

Figure 3B:
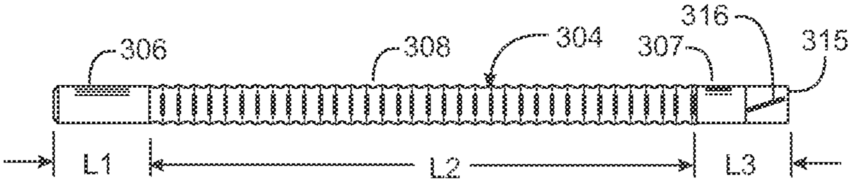
FIG. 3B is a side elevation view of a plunger of the crayon holder of FIG. 3A in an embodiment of the invention.

FIG. 3B is a side elevation view of plunger 304 which is of a diameter to slip fit in the bore of tubular body 301, has smooth ends 306 and 307 of lengths L1 and L3, and a series of smoothed circular grooves over a length L2. The spacing of the grooves in one embodiment is in one-eighth inch increments but may be more or less in other embodiments. The depth of the groves is in one embodiment about 0.010 inches but may be more or less in other embodiments. In one embodiment of the invention a crayon sharpener 315 is implemented on one end of plunger 304, enabling a user to sharpen a crayon or a crayon stub prior to inserting same in the opposite end of the crayon holder. The sharpener is much the same as a pencil sharpener, having a blade on an angle and an opening 316 for shavings to exit.

Figure 4A:
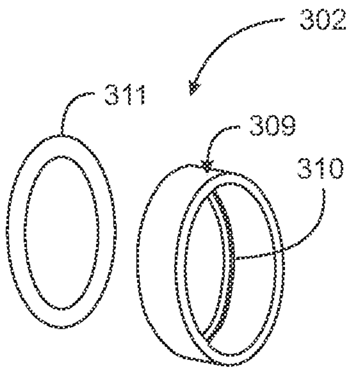
FIG. 4A is a perspective exploded view of a crayon retainer in an embodiment of the invention.
Figure 4B:
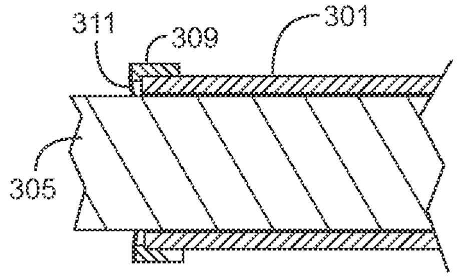
FIG. 4B is a section view of the crayon retainer of FIG. 4A joined to an end of the tubular body of the crayon holder of FIG. 3A.

FIG. 4A is a perspective exploded view of crayon retainer 302, comprising a cap 309 with a narrow internal shoulder 310 and a thin plastic cylindrical sheet 311. FIG. 4B is a section view illustrating retainer 302 assembled over one end of tubular body 301 such that the end of the tubular body engages shoulder 310. Thin plastic cylinder 311 is joined to cap 309, in one embodiment by glue, but may be fastened in other embodiments in other ways. The inside diameter of plastic sheet 311 is a few thousandths less than the outside diameter of crayon 305, thus, with crayon 305 inserted through sheet 311 into tubular body 301 as shown, the plastic sheet deforms slightly and exerts a small force on the outside diameter of the crayon. The force is just enough to keep the crayon from falling out of tubular body 301, for which an ounce or so of force against the crayon is sufficient. In use, force on the crayon is invariably into tubular body 301 except when a user picks up the crayon and holder from a drawing.

Figure 5A:
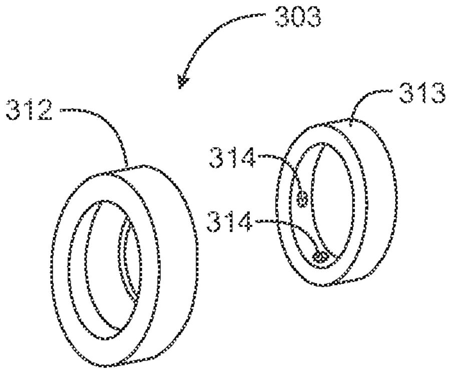
FIG. 5A is perspective exploded view of a plunger retainer in an embodiment of the invention.

FIG. 5A is a perspective exploded view of plunger retainer 303, which has a body 312 that holds a foam rubber ring 313 into which a plurality of metal or plastic balls 314 are molded. In this example there are four metal balls which are positioned on ninety-degree increments around the foam rubber ring and positioned to protrude inward from the ring.

Figure 5B:
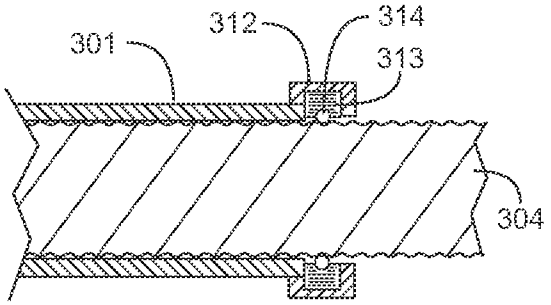
FIG. 5B is a section view of the plunger retainer of FIG. 5A joined to an end of the tubular body of the crayon holder of FIG. 3A in an embodiment of the invention.

FIG. 5B is a cross section of the plunger end of crayon holder 300 with plunger retainer 303 in place with body 312 engaged over the end of tubular body 301 and glued in place. The cross section illustrates how the foam rubber ring is captured and how the metal balls engage the smoothed circular grooves of plunger 304. It will be apparent to the skilled person that as plunger 304 is moved metal or plastic balls 314 snap into circular grooves in the plunger consecutively. The plunger may therefore be moved rather easily, and when released will be held in the longitudinal position where it was released.

Referring to FIG. 3A it may be seen that a crayon or crayon stub 305 may be inserted through crayon retainer 302, and the crayon or stub will be held in position. Plunger 304 may be advanced to touch the inner end of the crayon or crayon stub and will be held in that position by plunger retainer 303. The durometer of foam rubber ring 313 may be managed to provide sufficient staying force to prevent the crayon or stub from protruding any further into the tubular body.

It will be understood by the skilled person that the embodiments illustrated and described are entirely exemplary, and that many alterations might be made within the scope of the invention.

I claim:

1. A crayon holder, comprising:

a wooden tubular body having a first and a second end, a first cross slot through a first side of the tubular body proximate the first end, a second, circular cross slot partway through the first side of the body at a first distance along the length from the first cross slot, a third cross slot partway through the body on a second side of the body opposite the side with the first and second cross slots, a length, an outside diameter and an inside diameter, the inside diameter providing a slip fit for a crayon placed in the tubular body; and a mechanism adapted to hold the crayon in the tubular body, the mechanism comprising one portion of a clothespin, the one portion having a length, an extension joined at one end of the length in a direction orthogonal to the length, a circular groove anchor for the coil of a torsion spring of the clothespin, at a position a first distance from the extension joined at one end, and a cross slot across a top of the one portion, at a right angle to the length, at a position along the length between the extension at the one end and the circular groove, and a torsion coil spring of the clothespin, the torsion coil spring having a multiple-turn coil with an axis, a first extension from one end of the coil orthogonal to the axis with a first end away from the coil directed parallel the axis, a second extension from an opposite end of the coil orthogonal to the axis with a second end away from the coil directed parallel the axis;

wherein the one portion of the clothespin lies along the tubular body with the extension joined at one end in the first cross slot, with the coil of the torsion spring anchored in both the circular groove anchor in the tubular body and in the second circular cross slot in the one portion of the clothespin, with one end of the extension from one end of the coil of the spring engaged in the cross slot across the top of the one portion, and the end of the extension from the opposite end of the coil of the spring engaged in the third cross slot on the second side of the body opposite the side with the first and second cross slots, such that the one portion of the clothespin pivots around the anchored coil of the torsion spring, pressing the extension from the first end of the portion through the first cross slot against the crayon.

2. The crayon holder of claim 1 further comprising a zip tie adapted to hold the portion of the spring-loaded clothespin securely to the cylindrical body.

3. The crayon holder of claim 1 further comprising a crayon sharpening apparatus affixed at a second end of the tubular body.

* * * * *